*Reissue.*
J. Swan: Machinery for Manufacturing Augurs & Bits.
4516
REISSUED AUG 15 1871
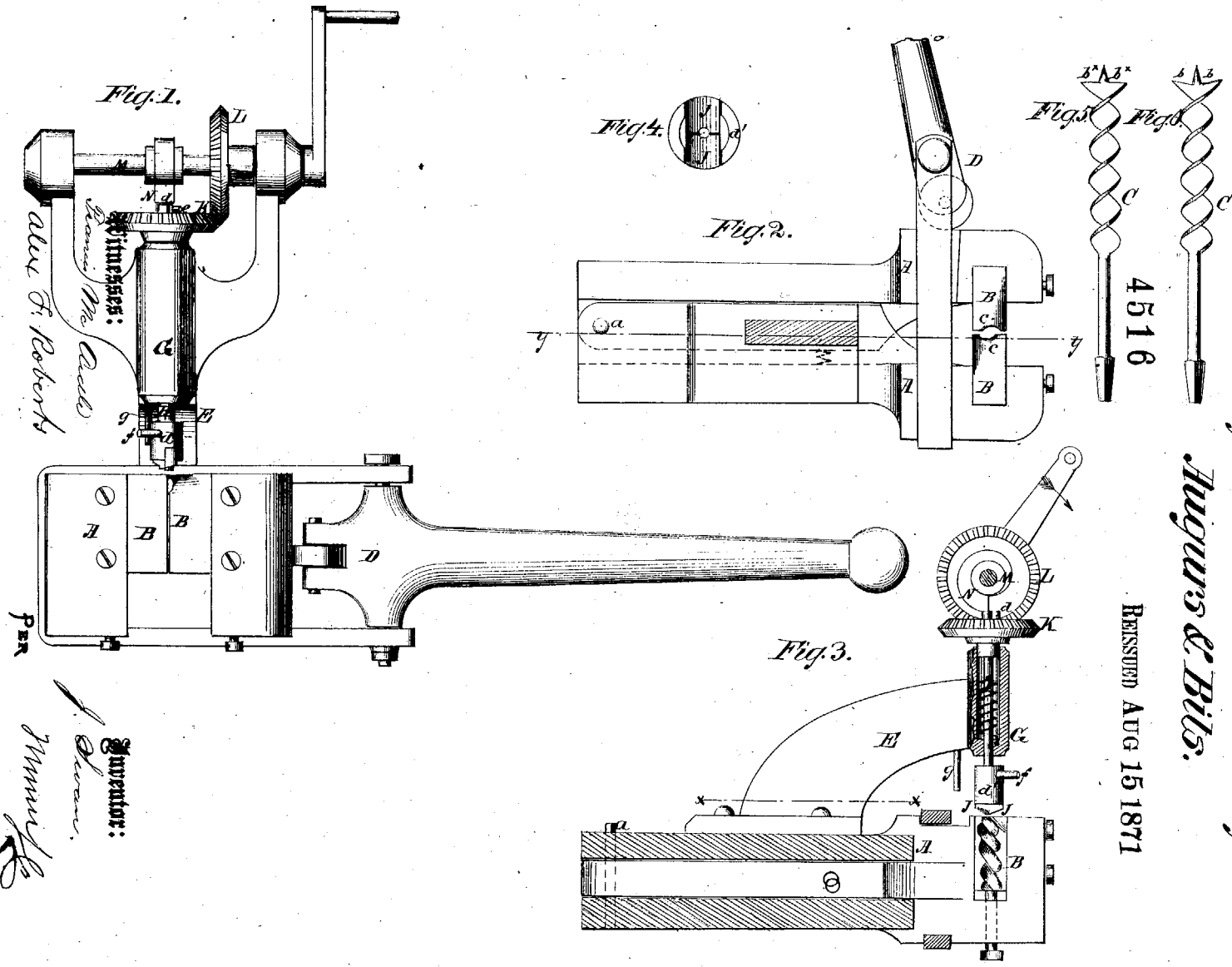
Witnesses:
Francis McAuliffe
Alex F. Roberts
Inventor:
J. Swan.
PER
Munn & Co
Attorneys.

UNITED STATES PATENT OFFICE.

JAMES SWAN, OF SEYMOUR, CONNECTICUT.

IMPROVEMENT IN MACHINES FOR MANUFACTURING AUGER-BITS.

Specification forming part of Letters Patent No. 78,769, dated June 9, 1868; reissue No. 4,516, dated August 15, 1871.

*To all whom it may concern:*

Be it known that I, JAMES SWAN, of Seymour, in the county of New Haven and State of Connecticut, have invented a new and useful Improvement in Machinery for Manufacturing Augers and Bits; and I do hereby declare that the following is a full, clear, and exact description thereof, which will enable those skilled in the art to make and use the same, reference being had to the accompanying drawing forming part of this specification.

My invention relates to machines for upsetting the lips of curved or gauge-lip augers; and consists in the peculiarities hereinafter fully described and subsequently pointed out in the claims. In manufacturing augers and bits of the above description it is necessary to leave a sufficient thickness of metal at the bit to admit of the spur or screw being formed, after which the lips require to be reduced and brought to a knife-like edge at their cutting parts, which process is termed "upsetting," and has hitherto been done by hand, but the most skillful workman can scarcely obtain a perfect form of cutters, and perfect uniformity in the two lips is rarely ever obtained.

My invention operates well, and performs the work expeditiously, with but very little manipulation on the part of the operator.

In the accompanying drawing, Figure 1 is a front view of my invention; Fig. 2, a plan or top view of the lower part of the same, the upper part being removed, as indicated by the line *x x*, Fig. 3; Fig. 3, a side sectional view of the same taken in the line *y y*, Fig. 2; Fig. 4, an under or face view of the swaging or drawing-die; Fig. 5, a side view of an auger to be operated upon; Fig. 6, a side view of an auger finished by my invention.

Similar letters of reference indicate corresponding parts.

A A represent two jaws, connected at one end by a pivot, *a*, and having dies B B inserted in their opposite ends to receive and hold the screw portion of the auger C while its cutters or lips *b b* are being operated upon, and the two jaws being brought together and held by a lever, D, as will be fully understood by referring to Figs. 1 and 2. The upper surfaces of the dies B B are grooved or hollowed out to conform to the desired shape of the lips or cutters, as shown at *c c* in Fig. 2. E represents a curved standard, which is attached to one of the jaws of the machine. This standard projects forward and has a cylindrical socket, G, at its front end, in which an arbor, H, is fitted and allowed to rotate, and also to move longitudinally to and from the auger or bit. On this arbor H, within the socket G, there is fitted an elastic retractor, I, made in the form of a spiral spring, one end thereof being attached to the arbor and the lower end attached to the bottom of the socket, as shown clearly in Fig. 3. This retractor I has a tendency to keep the arbor H elevated as high as it is designed to go, and to the lower end of the arbor there is attached a cylindrical hub, *d'*, in which the swaging or drawing-dies J J are fitted, the lower surfaces or faces of which are slightly inclined. On the upper part of the arbor H there is fitted loosely a bevel-wheel, K, into which a corresponding wheel, L, gears, the latter being on a horizontal shaft, M, the bearings of which are connected to the socket G. The bevel-wheel K has an upright pin, *d*, attached to it, and a pin, *e*, projects horizontally from the upper part of the arbor H, as shown in Fig. 1. The shaft M has a cam, N, firmly secured upon it, against which the upper end of arbor H is kept in contact by the retractor I. By this arrangement of the cam-retractor and gearing, as shown and described, two motions are given the arbor H—to wit, a longitudinal and a rotary movement—the arbor being pressed longitudinally in one direction by the action of the prominent portion of the cam N and retracted by the retractor I, when the prominent portion of the cam passes the upper end of the arbor. The rotary movement is given the arbor when the latter is forced or moved by the cam in consequence of the pin *d* of the wheel K coming in contact with the pin *e* of the arbor. A quarter-revolution, however, is only given the arbor H, as, when the arbor is retracted, the pin *e* of the arbor clears the pin *d* of the wheel K. The arbor H, in turning the quarter-revolution, as specified, winds the retractor I, which, as soon as the arbor retracts sufficiently to cause the pin *e* to clear the pin *d*, throws or turns back the arbor H to its original position, a pin, *f*, in the hub *d'* of the arbor coming in contact with a pin, *g*, in the under side of the standard E, these pins serving as a stop. (See Fig. 1.) The dies J J, when the arbor H is moved by the cam, act upon the lips or cutters *b b* of the auger or bit and draw them out to a thin edge, giving them the proper shape or form. In Fig. 5, $b^{\times}$ represents the thick edges of an unfinished lip or cutter, and *b*, Fig. 6, the finished lip or cutter operated upon by my invention.

Having thus described my invention, I claim as new and desire to secure by Letters Patent—

1. The combination of the clamping-jaws B and the stationary or female dies formed therein—the die J to operate in conjunction with said stationary dies to bend, compress, and draw the lips of the blank; mechanism to impart to die J reciprocating rotary movements upon its axis; mechanism to force said die J gradually and rectilinearly up to and against the auger-bit, and the spring or its equivalent to suddenly force said die away from said bit—the combination being such as to effect the operations here ascribed to it in the manner substantially as hereinbefore described.

2. The combination of the arbor H and supporting and guiding-frame; mechanism to impart to said arbor a rectilinear and also a rotary movement; the spring I arranged as described to impart to said arbor reciprocal rectilinear and rotary movements in opposite directions; the die J, the clamping-jaws B, and the stationary or female-bit swaging-dies upon or within said jaws B.

3. The combination of cam N, rotating-wheel K having vertical pin *d*, arbor H having horizontal pin *e*, the hub *d'* having pin *f*, and the hollow standard G having pin *g*, all arranged substantially as described to turn the stock *d'* exactly one quadrant of a circle and no more.

JAMES SWAN.

Witnesses:
GEO. W. MABEE,
T. B. MOSHER.